(12) United States Patent
Raymond

(10) Patent No.: US 9,315,213 B2
(45) Date of Patent: Apr. 19, 2016

(54) PLANAR SPACE FRAME FOR VEHICLE STRUCTURE AND HOUSING OF COMPONENTS

(71) Applicant: PANTERO TECHNOLOGIES INC., Montreal (CA)

(72) Inventor: Jean Raymond, Montreal (CA)

(73) Assignee: PANTERO TECHNOLOGIES INC., Montreal, QC (CA)

( * ) Notice: Subject to any disclaimer, the term of this patent is extended or adjusted under 35 U.S.C. 154(b) by 0 days.

(21) Appl. No.: 14/409,665

(22) PCT Filed: Jun. 19, 2013

(86) PCT No.: PCT/CA2013/000598
§ 371 (c)(1),
(2) Date: Dec. 19, 2014

(87) PCT Pub. No.: WO2013/188967
PCT Pub. Date: Dec. 27, 2013

(65) Prior Publication Data
US 2015/0175210 A1    Jun. 25, 2015

Related U.S. Application Data

(60) Provisional application No. 61/662,522, filed on Jun. 21, 2012.

(51) Int. Cl.
*B62D 21/10*    (2006.01)
*B62D 25/02*    (2006.01)
(Continued)

(52) U.S. Cl.
CPC ............... *B62D 25/02* (2013.01); *B21D 53/88* (2013.01); *B32B 3/10* (2013.01); *B32B 15/043* (2013.01);
(Continued)

(58) Field of Classification Search
CPC ......... B62D 25/02; B62D 21/10; B62D 25/20

USPC ........... 296/193.07, 181.1, 186.1, 184.1, 191; 428/178; 52/673, 674, 675
See application file for complete search history.

(56) References Cited

U.S. PATENT DOCUMENTS

| 3,673,057 A | 6/1972 | Fairbanks |
| 5,958,551 A | 9/1999 | Garcia-Ochoa |

(Continued)

FOREIGN PATENT DOCUMENTS

WO        WO0047839 A1    8/2000

OTHER PUBLICATIONS

International Search Report, PCT/CA2013/000598, Sep. 10, 2013.

*Primary Examiner* — Jason S Morrow
(74) *Attorney, Agent, or Firm* — Norton Rose Fulbright Canada LLP

(57) ABSTRACT

A planar space frame for a unibody panel of a vehicle comprises a core mounted onto the bottom side of a load bearing panel. The core is a 3-D truss including a series of triangular prisms. The triangular prisms have a specific pattern of alternating triangular openings on each of their three lateral faces. For each triangular prism, triangular openings located on the lateral face which is part of a planar layer are alternating right triangles placed two by two to form rectangular units. The right triangles are arranged to have the edges on each side of the right angles aligned with the edges of the planar layer. The triangular openings located on the two inclined lateral faces of each triangular prism, are alternating isosceles triangles placed two by two to form rhomboid units. This combination of triangles provides structural strength and housing functionality.

20 Claims, 11 Drawing Sheets

(51) Int. Cl.
  *E04C 2/08* (2006.01)
  *E04C 2/34* (2006.01)
  *B32B 15/04* (2006.01)
  *B32B 3/10* (2006.01)
  *B21D 53/88* (2006.01)
  *B60K 1/04* (2006.01)
  *B62D 25/06* (2006.01)
  *B62D 25/20* (2006.01)

(52) U.S. Cl.
  CPC . *B60K 1/04* (2013.01); *B62D 21/10* (2013.01); *B62D 25/06* (2013.01); *B62D 25/20* (2013.01); *E04C 2/08* (2013.01); *E04C 2/34* (2013.01); *E04C 2002/3488* (2013.01); *Y10T 29/49622* (2015.01)

(56) References Cited

U.S. PATENT DOCUMENTS

| | | | |
|---|---|---|---|
| 6,207,256 B1* | 3/2001 | Tashiro | B32B 3/12 428/116 |
| 7,424,967 B2* | 9/2008 | Ervin | A47J 36/02 228/181 |
| 7,762,938 B2 | 7/2010 | Gale | |
| 8,129,013 B2* | 3/2012 | Ichigaya | A41D 13/002 428/178 |
| 2011/0041455 A1 | 2/2011 | Phillips | |
| 2014/0130657 A1* | 5/2014 | Pilpel | F41H 5/0485 89/36.02 |
| 2015/0004371 A1* | 1/2015 | Noble | E04C 2/3405 428/178 |
| 2015/0158532 A1* | 6/2015 | Ayuzawa | B62D 25/2009 296/193.07 |

* cited by examiner

PLANAR SPACE FRAME FOR VEHICLE STRUCTURE AND HOUSING OF COMPONENTS

TECHNICAL FIELD

The invention generally relates to a planar space frame-like structure, the application thereof in commercial vehicles for chassis and unibody construction, and methods for manufacturing same.

BACKGROUND

A planar space frame is generally defined as a truss-like structure system in the form of a network of elements (as opposed to a continuous surface) so arranged that forces are transferred in a three-dimensional manner. A space frame is typically constructed from interlocking struts or members in a geometric pattern. Macroscopically, a planar space frame takes the form of a flat or generally flat structure (slight curvature and/or slight change in thickness may be present).

Space frames have been largely used in architecture and civil engineering to build large structures. They are recognized and used for their mechanical properties, and particularly their rigidity, stiffness and ability to resist heavy concentrated load, as well as for their lightness, and their economy in use of materials.

Planar space frame structures have not been used to the same extent in automotive engineering because of the much smaller scale, the complexity of defining economically viable fabrication methods, and the lack of appropriate usages.

U.S. Pat. No. 6,207,256 to Tashiro introduced various methods to produce some embodiments of a planar space frame (space truss) composite panel of few tens of centimeters in thickness, or less. Tashiro's concepts using sheet metal still present some drawbacks in terms of manufacturability, design flexibility and mechanical properties for chassis or unibody constructions. Among other things, the proposed embodiments do not efficiently distribute sheer and torsional stresses which are important in a body construction of commercial vehicles, and they do not easily allow for a variation in width of the ribs for specific local load requirements and/or global load paths.

As know from the art, commercial vehicles such as city buses generally have a body frame integral construction also known as a unibody construction. In such a construction, a load bearing lattice structure comprises longitudinal and transverse horizontal beams and vertical uprights attached to each other in intersections. The integral frame is subsequently covered with sheet cladding materials riveted, glued or otherwise fixed. The exterior cladding is generally sheet aluminum, stainless steel or molded fiberglass skins. Floor panels are generally fabricated from plywood and composite materials.

Roof and floor panels may also present a sandwich-like construction in which two load bearing skins are separated by a core of stiffening lightweight material to provide higher strength and rigidity in some areas. Structural sandwich constructions with complex cores such as honeycomb cores are not intensively used in the automotive industry mainly due to their high price. Simple corrugated cores between two flat sheets are more common.

With a typical unibody construction, the body interior of a mass transit vehicle generally includes recesses for front and rear wheels and other vehicle components such as batteries and controllers in many battery-dominant electric buses. On the roof, we generally found enclosures for components such as HVAC and energy storage equipments (batteries, power electronics controllers, charging equipments, gas cylinders, etc.). These constructions have known disadvantages. Recesses inside the vehicle affect passenger capacity, flexibility in seating layout, passenger flow, and create steps or higher floor section inside the vehicle. Storing components on the roof raises the center of mass affecting the vehicle dynamics such as its tendency to roll, and generates higher stresses on the body construction. This impacts the overall structure which needs to be reinforced, which generally contribute to increase the overall vehicle curb weight and the manufacturing cost. These drawbacks are particularly visible in a majority of new battery-dominant electric buses having a large amount of batteries.

The trend toward function integration and lightweight design favor the reengineering of existing systems and components in order to permit an optimal usage of material, to reduce part count and assembly complexity, and to reduce vehicle weight. Accordingly, there is a need for an improved floor/roof panel construction providing both structural properties and the capability of housing embedded systems.

While prior vehicle constructions have been adequate for many purposes, they have lacked some of the advantages obtainable with the embodiments of the present invention. Many advantages of the invention are clearly described hereinafter and others shall be readily apparent to those skilled in the art.

SUMMARY

Therefore, in accordance with a general aspect of the present application, there is provided a planar space frame-like structure that combines the functionalities of a structural member of a vehicle chassis or unibody structure with the functionalities of a structural and functional housing for vehicle components.

In accordance with another aspect, there is provided a planar space frame-like structure for the construction of floors and roofs of commercial vehicles.

In accordance with a further aspect, there is provided methods for fabricating such planar space frame-like structures.

In accordance with a further aspect, there is provided a unibody panel structure assembly for a vehicle, comprising a planar space frame core and a load bearing face panel, said planar space frame core being mounted onto a bottom side of said face panel, said planar space frame core being constructed from continuous transverse planar elements arranged into a series of adjacent triangular prisms, extending traverse to the plane of said face panel, said triangular prisms having on each of their three lateral faces a majority of the material removed in a row of alternating triangular openings, said triangular prisms being positioned side by side in a manner to have a first lateral face aligned in a same plane and collectively forming a first planar layer lying parallel to said face panel, said triangular openings located on said planar layer being alternating right angle triangles placed two by two to form a rectangular unit, wherein two adjacent rectangular units being mirror images of each other, and wherein the edges on each side of the right angles of said right angle triangles are aligned with the edges of said planar layer, said triangular openings located on the second and third lateral faces of said triangular prisms being alternating isosceles triangles placed two by two to form a rhomboid unit, said rhomboid unit being reproduced by translation across each of said lateral face, and wherein the pattern thereof on the second and third lateral faces are mirror images of each other.

In accordance with a still further aspect, there is provided a unibody panel structure assembly for a vehicle comprising a planar space frame core and a load bearing face panel, said planar space frame core being mounted onto a bottom side of said face panel, said planar space frame core being constructed from a metal sheet having a plurality of triangular wings cut and bent out and afterward joined to said face panel, said triangular wings being right angle triangles placed in a manner to create a plurality of right angle triangular openings in said sheet, said openings being placed two by two to form a rectangular unit, and wherein two adjacent rectangular units are mirror images of each other, said rectangular units forming continuous lattice lines on each of their sides, said triangular wings having their respective bent line on one of said lattice line in a manner to be all parallel, said triangular wings being bent in a manner to form a series of triangular prismatic-like volumes between said face panel and said metal sheet and traverse to the plane of said face panel, said triangular wings having a triangular opening in their center.

DESCRIPTION

In the context of the present application, the term "unibody panel" should be interpreted as meaning any structural panel in a unibody, partial unibody or chassis construction, comprising any panel for floor, roof, side walls, front end, rear end, partition walls and internal structures; the term "planar" should be interpreted as also comprising slight curvatures or deformations; and the term "triangular" should be interpreted in a generic sense and may also mean a triangular shape with truncated or rounded corners.

Figure 8:
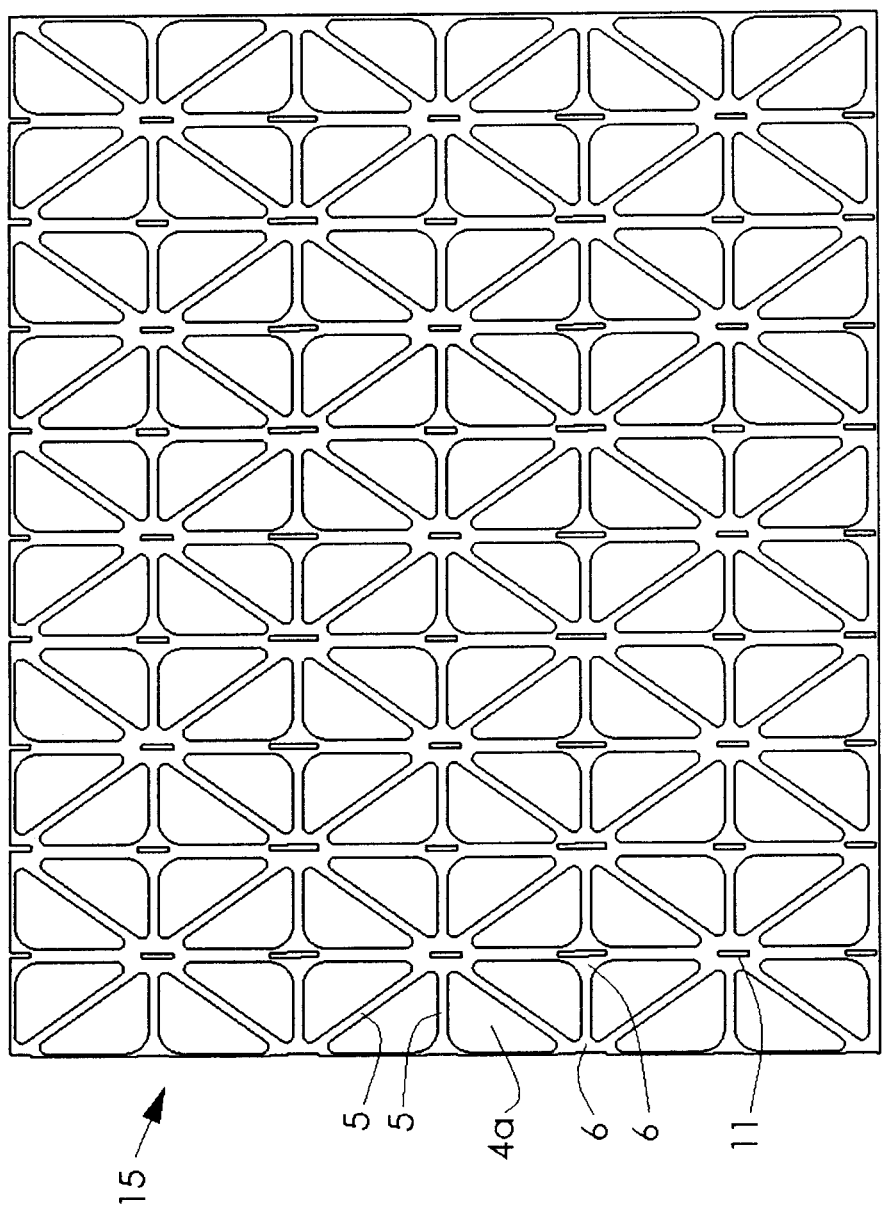
FIG. 8 is a top plan view of a metal sheet used as a planar layer having triangular openings in a pattern of alternating right triangles forming mirrored rectangular units.
Figure 9:
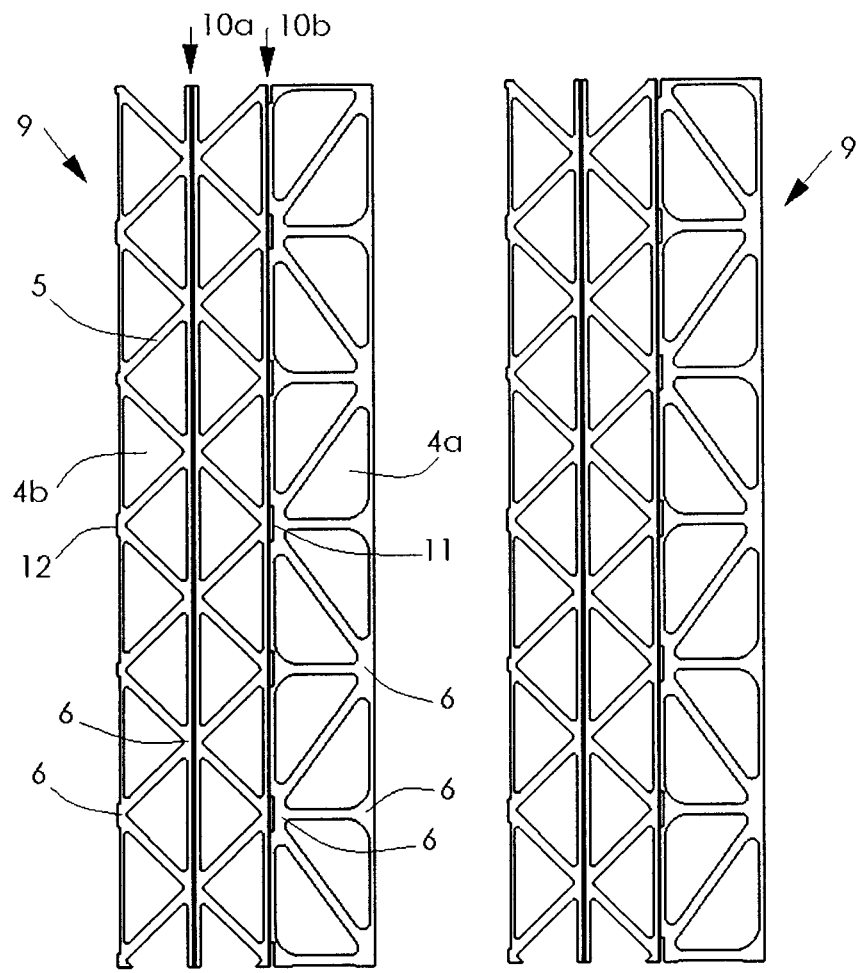
FIG. 9 is a top plan view of two flat metal sheets to be bent in a square root-like shape in accordance with one method of fabricating the space frame core illustrated in FIG. 4.
Figure 11:
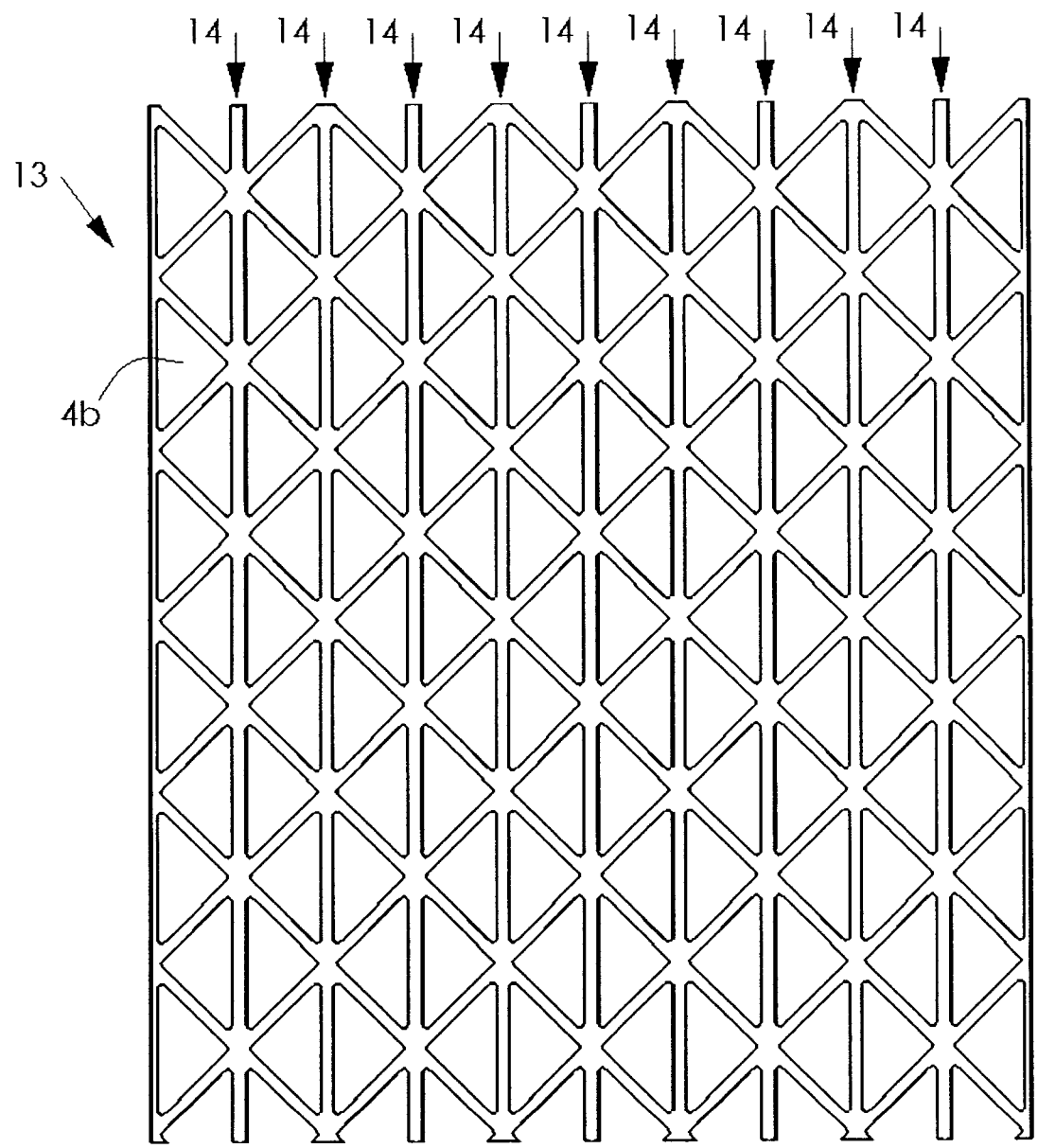
FIG. 11 is a top plan view of a flat metal sheet having triangular openings in a pattern of alternating isosceles right triangles forming rhomboid units, to be bent in a zigzag pattern in accordance with another method of fabricating the space frame core illustrated in FIG. 4.

Referring to the drawings, an embodiment of a load bearing planar space frame structure assembly (1) comprises a planar space frame core (2) mounted onto the bottom side of a load bearing face panel (3). The space frame core (2) is constructed as a three-dimensional truss-like structure, made of sheet metal or linear extrusions rather than conventional interlocking struts. A characteristic of these sheets or extrusions is to have a majority of their material removed in specific patterns of alternating triangular openings (4a, 4b); leaving a succession of ribs (5) forming triangles or triangular units that are typical of a truss, such as illustrated in FIGS. 8, 9 and 11 for metal sheets and FIG. 12 for an extrusion. As described hereinafter, the metal sheets or extrusions are assembled in a manner to obtain in a three-dimensional space a plurality of triangular units creating the planar space frame core (2).

Figure 2:
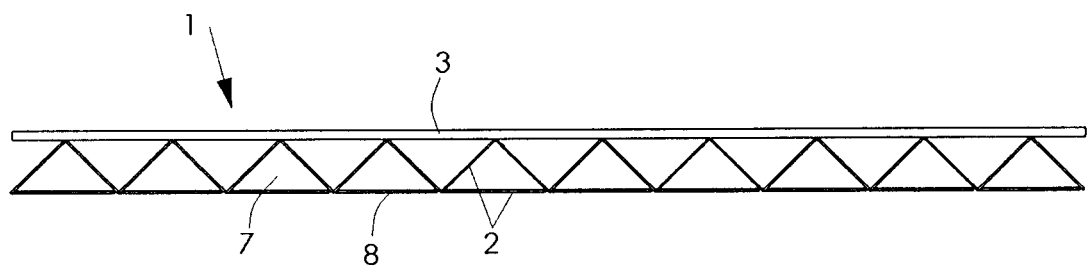
FIG. 2 is a side view of the structure as viewed along direction A in FIG. 1 and illustrating the obstruction-free triangular prismatic open volumes.
Figure 4:
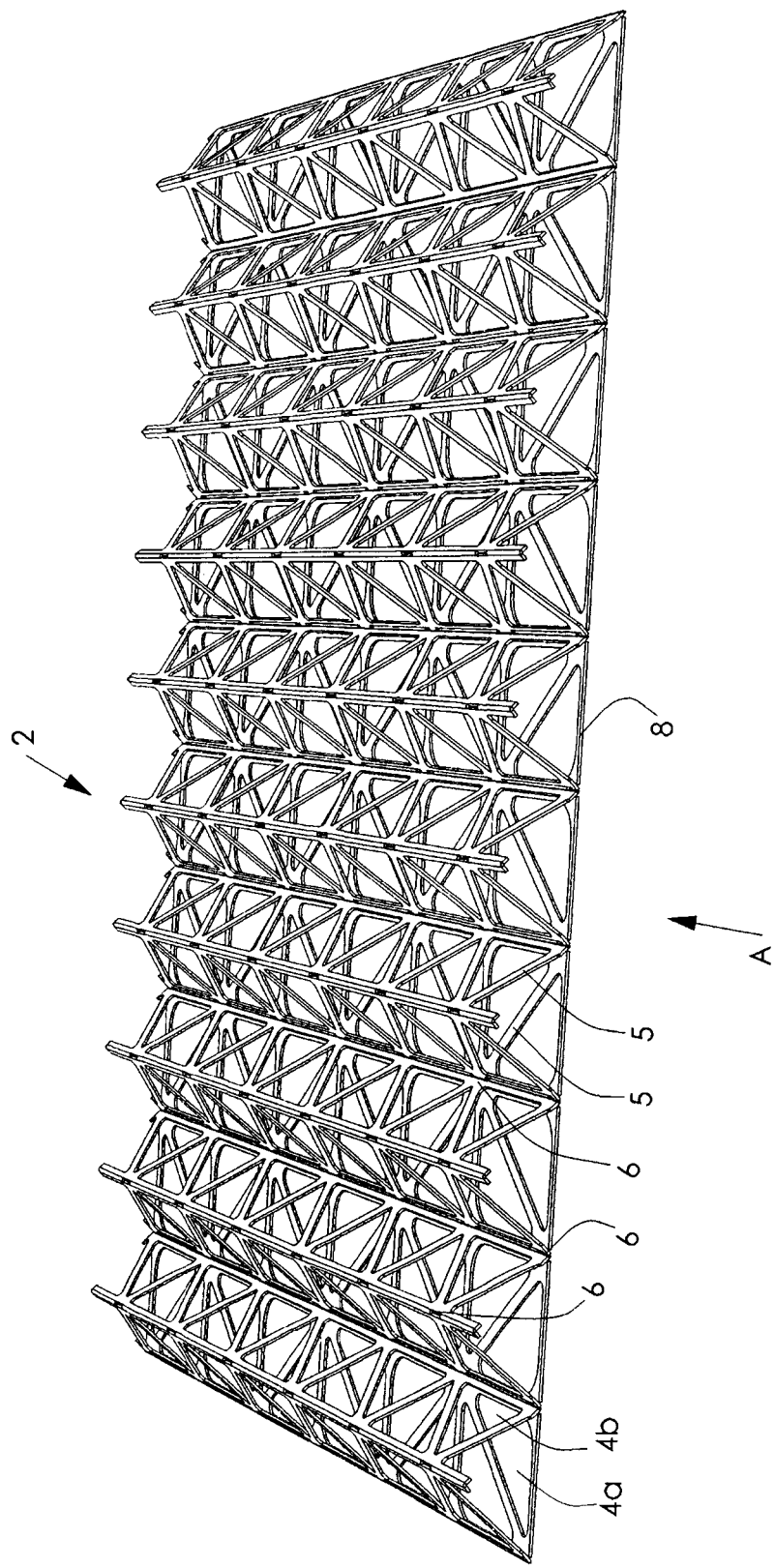
FIG. 4 is a perspective view of the planar space frame core of the structure according to one embodiment having one planar layer.
Figure 5:
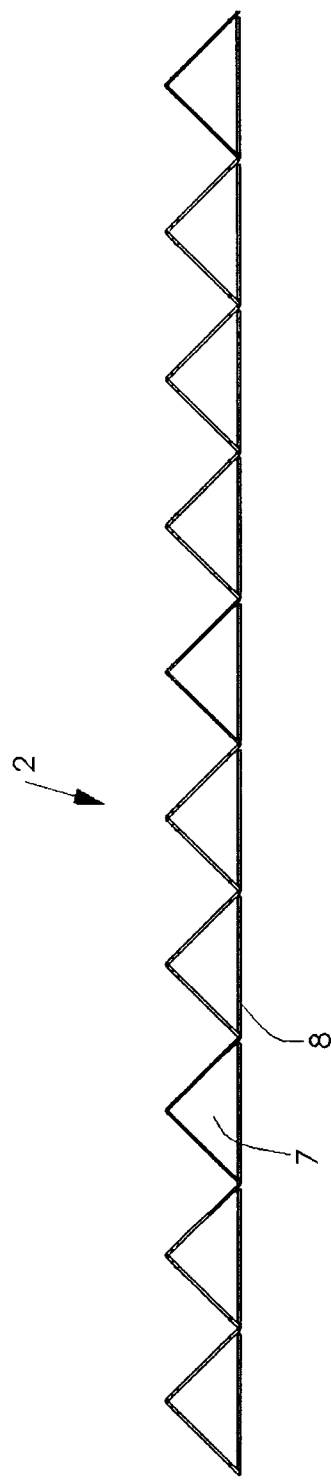
FIG. 5 is a side view of the space frame core as viewed along direction A in FIG. 4.
Figure 6:
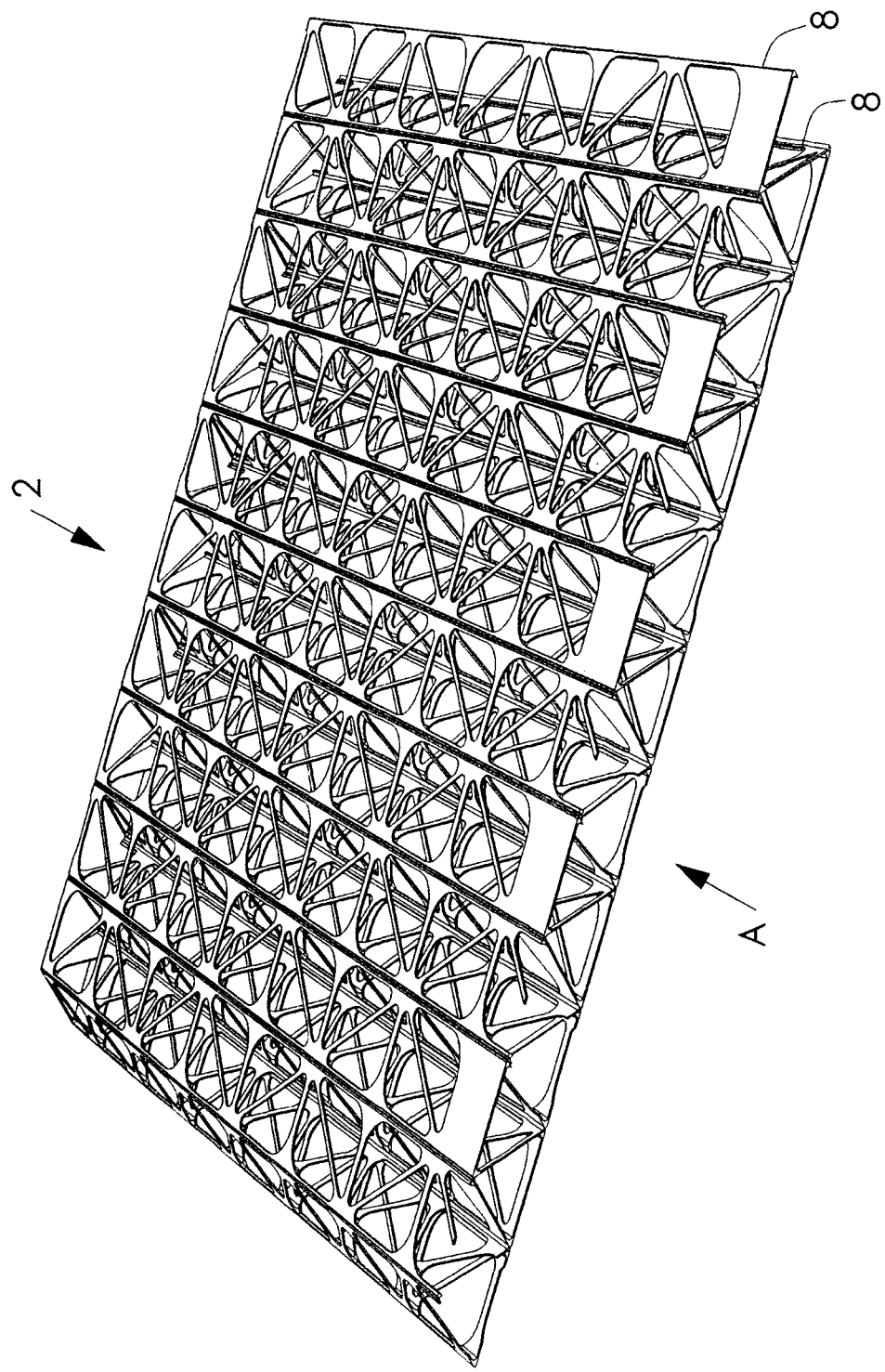
FIG. 6 is a perspective view of the planar space frame core of the structure according to another embodiment having two planar layers.
Figure 7:
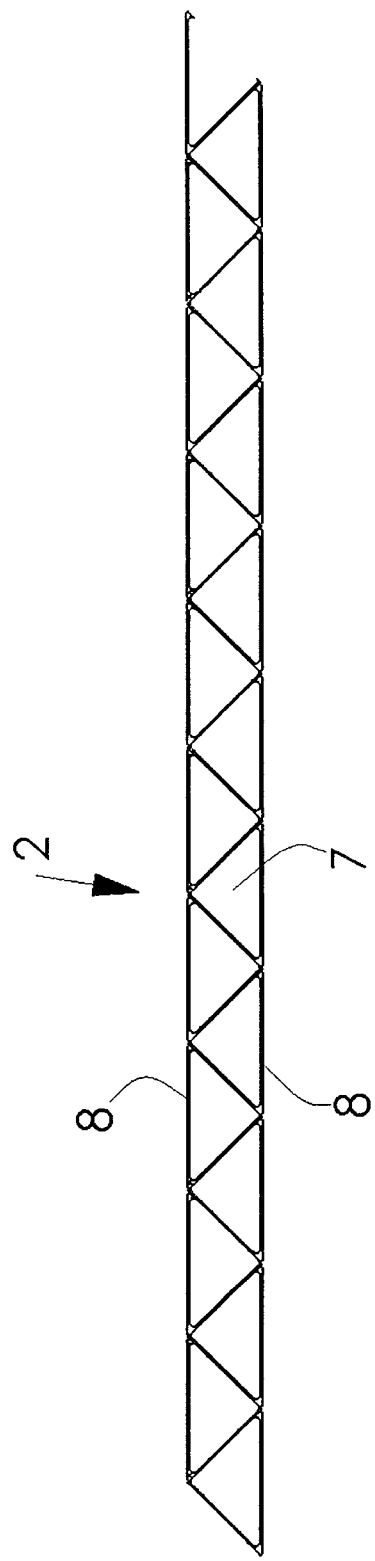
FIG. 7 is a side view of the space frame core as viewed along direction A in FIG. 6.

As illustrated in FIGS. 2, 5 and 7, the planar space frame core (2) may be viewed as a series of adjacent triangular prisms that extend traverse to the plane of the face panel (3). These triangular prisms have specific patterns of alternating triangular openings on each of their three lateral faces. The prisms are positioned side by side in a manner to have one of their lateral faces in the same plane and collectively forming a planar layer (8) lying parallel to the face panel (3). In preferred embodiments, there is only one such planar layer (8) at the bottom of the space frame core (2) such as illustrated in FIGS. 4 and 5. In alternative embodiments, there are two such planar layers (8), one at the bottom and the other on top of the space frame core (2) such as illustrated in FIGS. 6 and 7.

In order to obtain proper mechanical properties for the planar space frame structure assembly (1), the triangular openings (4a, 4b) of the constituting members are characterized by having specific geometry and pattern according to their location and function in the core assembly (2).

For each triangular prism, triangular openings located on the lateral face which is part of a planar layer (8) are alternating right triangles (4a) placed two by two so that their hypotenuse is on the same line segment, thus forming a rectangular unit, and wherein two adjacent rectangular units are mirror images of each other. The right triangles (4a) thereof are also arranged to have the edges on each side of their right angles aligned with the edges of the planar layer (8) in order to provide longitudinal and transversal bending stiffness under load while diagonal edges contribute to torsional stiffness (particularly when diagonal edges are continuously aligned across the planar layer). The resulting pattern for the planer layer (8) is illustrated in FIG. 8.

Figure 3:
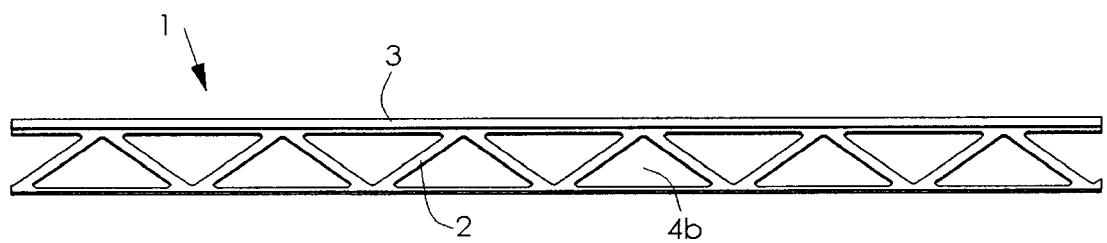
FIG. 3 is a side view of the structure as viewed along direction B in FIG. 1.

The triangular openings located on the two inclined lateral faces of each triangular prism, are alternating isosceles right triangles (4b) placed two by two so that one of their congruent sides is on the same line segment and their median to the hypotenuse are parallel one to each other, thus forming a rhomboid (parallelogram) unit. This rhomboid unit is reproduced by translation across the lateral face. The resulting pattern is illustrated in FIG. 3. The pattern thereof on one inclined lateral face is reproduced by its mirror image on the second inclined lateral face. The isosceles right triangle (4b) thereof are arranged to have their two congruent sides oriented with the internal sheer stresses of the planar space frame structure assembly (1) resulting in a conversion of sheer stresses into tensile and compressive stresses between lattice nodes. If isosceles right triangle is one of the preferred shapes as described hereinabove for optimal mechanical properties, any isosceles triangles may also be used in alternative embodiments.

In such a construction, a significant part of the unstressed material is removed. In order to accommodate local load requirements and global load paths, ribs (5) width may be varied and adjusted accordingly, without affecting the interior volume (7) of the triangular prisms. Total thickness of the construction may vary according to the specific usage, but is typically in the range of few to some tens of centimeters.

In preferred embodiments where sheet metal is used to create the planar space frame core (2) as described hereinafter, a metal foam sandwich panel, or an assembly of such panels, is used as the load bearing face panel (3). The metal foam sandwich panel comprises a lightweight metallic foam core with metallic skins on each side of the panel. The foam core and each skin may be of the same material (e.g. aluminum) or made of different metals according to specific requirements (e.g. an aluminum core with steel skins, or alternatively one skin being aluminum and the other being steel). One function of this metal foam sandwich panel is to provide the dimensional stability required for the assembly. It also contributes to the local and global bending and torsional rigidity of the assembly, without significantly increasing weight when compared to an equivalent thick metal plate.

Figure 15:
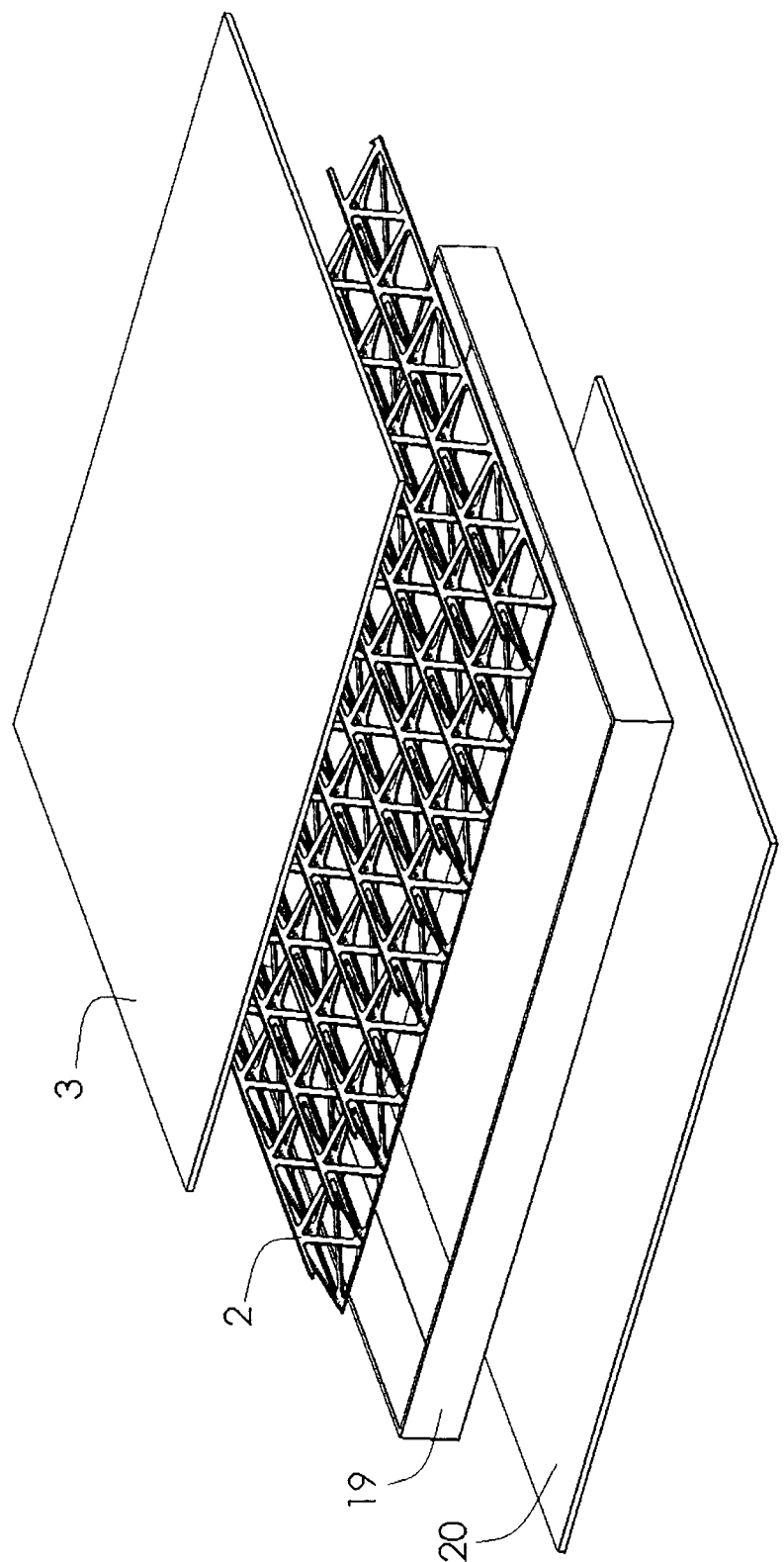
FIG. 15 is an exploded view illustrating a simplified enclosure made of the planar space frame structure assembly according to one embodiment of the present invention.

In one preferred embodiment, the planar space frame structure assembly (1), comprising the planar space frame core (2) and the load bearing face panel (3), is afterwards closed at its ends with removable side panels (19) and on the other face with removable bottom panels (20) in order to have a complete enclosure forming a unibody module for a floor or a roof, as illustrated in FIG. 15. The result is an optimum usage of materials maximizing both mechanical properties and internal usable volume for housing a large quantity of cylindrical or triangular/rectangular prismatic components and/or for thermally controlled air flow.

One specific feature of this structure assembly is to provide an enclosure with internal passages for air flow, providing moisture trapping control and thermal regulation of the enclosed components. In one preferred embodiment, the enclosure is lightly pressurized to protect against water or contaminant infiltration inside the compartment.

Figure 1:
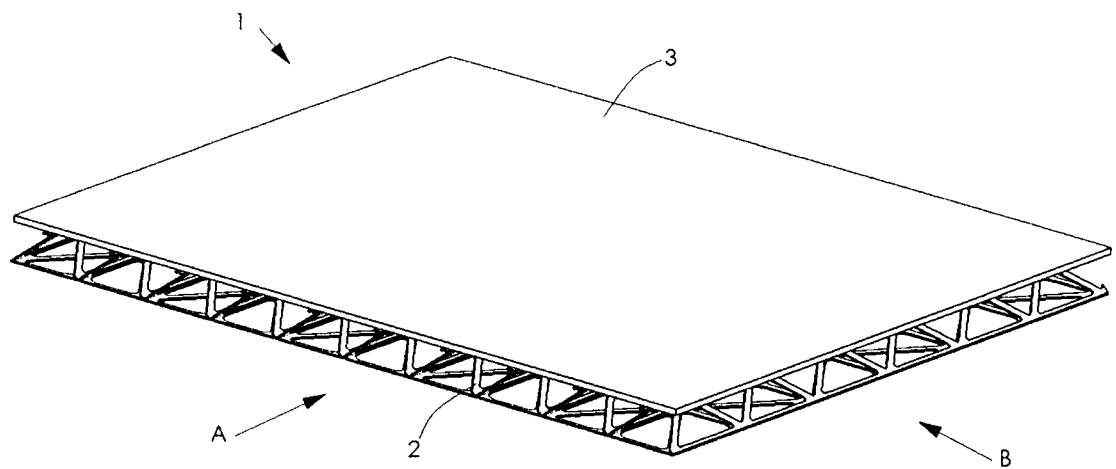
FIG. 1 is a perspective view of a planar space frame structure assembly constructed in accordance with one embodiment of the present invention.

Another feature is to provide an easy access to enclosed components via removable bottom panels (20) and/or side panels (19). The enclosed components can be loaded into the construction from the ends since the construction provides long obstruction-free tube-like triangular prismatic volumes (7) as illustrated in FIG. 2 which present a side view of the structure shown in FIG. 1. Access for final assembly, maintenance and connectivity is provided by at least one removable bottom panel (20) giving an access to the open planar space frame core (2).

A feature of preferred embodiments of the planar space frame structure assembly (1) comprising a metal foam sandwich panel as the load bearing face panel (3) is to provide rigid compartments while still capable to absorb impact energy. By its nature, the space frame core (2) is highly stiff and can tolerate strong impact before plastic deformation. At the same time, metal foam sandwich panels have the capability of absorbing considerable impact energy by large plastic deformation under quasi-static or dynamic loading, making them ideal structure protectors and energy absorbers.

According to one preferred embodiment, the use of a metal foam sandwich panel, and specifically a sandwich panel with an aluminum foam core, as the load bearing face panel (3) provides many additional functions to the surface of this construction. The aluminum foam provides protection against localized hot fire that can result from the combustion of enclosed components; it also provides electromagnetic shielding to and from those said components while also absorbing vibration and acoustic energy.

Globally, such a construction may contribute to improve bending and torsional stiffness-to-weight ratios of the overall body construction, to reduce vehicle weight and assembly complexity, while providing a secure and thermally controlled enclosure for embedded systems.

It is contemplated to use the planar space frame structure assembly (1) in vehicles. The primary usage for this structure is for structural floors and roofs of commercial vehicles with long and essentially flat interior surface for passengers or cargo, such as buses or delivery trucks.

According to one embodiment, the planar space frame structure assembly (1) becomes a structural floor which is also the protective enclosure for a large quantity of batteries, capacitors or other kind of energy storage apparatus, and electric/electronic components of an electric vehicle. The mechanical and functional properties of such structures make them a key enabler in the realization of battery powered vehicles. The planar space frame structure assembly (1) provides sufficient structure for drivable chassis or partial section of chassis where powertrain equipments, axles and suspensions are assembled to it prior to the fabrication of the body or completion of the unibody. This is the same principle used for ladder frame vehicles but adapted to flat floor electric vehicles.

In another embodiment, the planar space frame structure assembly (1) becomes a structural roof which also integrates air duct features with heating, ventilation, and air conditioning (HVAC) functionalities.

While the above descriptions constitute a plurality of embodiments of the present invention, it will be appreciated that the present invention is susceptible to further modification and change without departing from the fair meaning of the accompanying claims.

As will be seen hereinafter, various methods are contemplated for manufacturing embodiments of the planar space frame structure assembly (1).

Four methods are described hereinbelow to illustrate the principle of how embodiments of planar space frame-like structures (1) can be fabricated. In the preferred embodiments, aluminum and steel are the preferred materials, but other suitable materials or combination of materials can be used. The objective is always to minimize the usage of unstressed material, maximize the usable internal volume, with an easy to automate process. Each of these methods has benefits and drawbacks, and is more or less adapted according to the intended manufacturing volumes and constraints on capital expenditures. While the following descriptions constitute a plurality of embodiments of the present invention, many modifications and variations of the methods herein described are possible in light of the present invention, including alternative but equivalent methods. One of ordinary skills in the art would recognize that certain modifications and variations would come within the scope of the present invention. The following descriptions refer to joining means that may comprise any suitable means such as welding, brazing, friction drilling, flow drilling and tapping, mechanical fasteners, adhesive, and the like, and any combination thereof.

Figure 10:
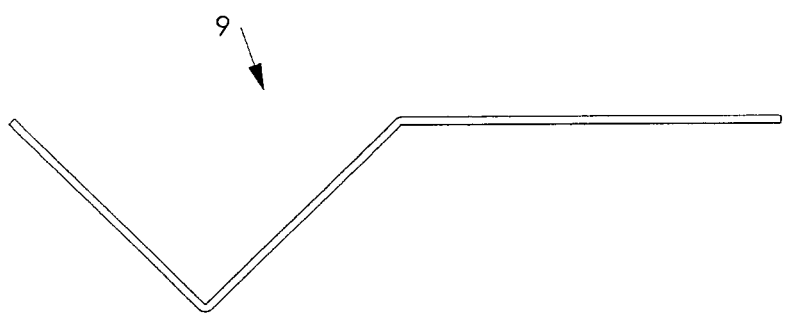
FIG. 10 is an end view of the metal sheet illustrated in FIG. 9 and bent in a square-root-like shape.

First method according to one embodiment. A metal foam sandwich panel is used as the load bearing face panel (3) of the assembly. The space frame core (2) is made of a plurality of bent metal sheets (9). Each metal sheet (9) having the majority of the material removed by cutting or stamping three rows of alternating triangular openings, leaving a succession of ribs (5) that are typical of a flat truss, as shown in FIG. 9. Each sheet (9) comprises two straight longitudinal lattice lines (10a, 10b) separating each row of openings. On each side of the first lattice line (10a), the triangular openings (4b) are characterized by being alternating isosceles triangles placed two by two to form a rhomboid unit which is reproduced by translation across each row, and wherein the pattern on one row is the mirror image of the other. On the other side of the second lattice line (10b) corresponding to the third row, the triangular openings (4a) are characterized by being alternating right triangles placed two by two to form a rectangular unit, and wherein two adjacent rectangular units are mirror images of each other. As shown in FIG. 9, two versions of these metal sheets (9) are required, wherein said openings in the third row of each sheet is the mirror image of the other. Each sheet (9) is bent at its lattice lines (10a, 10b) in a square root-like shape as illustrated in FIG. 10. This results in a V-shaped member with each side at 45 degrees to the horizontal plan, and a horizontal member. The edge of the V-shaped member of a first bent metal sheet (9) is joined to the face panel (3), wherein joining points when required correspond to lattice nodes (6). The other bent sheets (9) are similarly joined to the face panel (3) by superposing the horizontal member of one sheet over the opening of the V shape of its adjacent sheet in order to form a series of triangular prisms, as illustrated in FIGS. 4 and 5, thus forming the planar space frame core (2). Adjacent bent sheets are joined together at their common lattice nodes (6). The open assembly is designed to provide easy access for joining. The bent sheets include slots (11) and tabs (12) at joining points to minimize the tooling and insure proper relative location of sheets. The rigid metal foam sandwich panel (3) provides the stiffness and dimensional stability that help this construction to keep the desired final shape and dimension while joining, reducing the need for jigs and fixtures.

Second method according to another embodiment. A metal foam sandwich panel is used as the load bearing face panel (3) of the assembly. The planar space frame core (2) is made of two metal sheets. As shown in FIG. 11, a first sheet (13) has most of the material removed by cutting or stamping rows of alternating triangular openings, leaving a succession of ribs that are typical of a flat truss. The triangular openings (4b) are characterized by being alternating isosceles right triangles placed two by two to form a rhomboid unit which is reproduced by translation across a row, and wherein two adjacent rows are mirror images of each other, such as illustrated in FIG. 11. This first sheet (13) is bent at 90 degrees at each of its transversal lattice lines (14) in a zigzag pattern. The edges on one side of the bent sheet are joined to the face panel (3) at lattice nodes. As an alternative but equivalent embodiment, the first sheet (13) may be replaced by a plurality of shorter similar sheets, comprising at least two rows of alternating triangular openings in order to form at least one V shape once bent, and being afterward joined together once joined to the face panel (3). A second sheet (15) (see FIG. 8) is used as a support element for the first sheet (13) (or for the equivalent assembly) and thus forming the planar bottom layer (8) aforementioned. The second sheet (15) has also the majority of the material removed to form a flat truss by creating rows of alternating right triangles (4a) placed two by two to form a rectangular unit, and wherein two adjacent rectangular units are mirror images of each other, such as illustrated in FIG. 8. This second sheet (15) is joined to the bent sheet (13) in order to form a series of triangular prisms. The two sheets are joined together at their common lattice nodes (6) to form the space frame core (2) as illustrated in FIGS. 4 and 5. The open assembly is designed to provide access for joining. Slots and tabs can be used to minimize the tooling and insure proper relative location of sheets. The rigid metal foam sandwich panel (3) provides the stiffness and dimensional stability that help this construction to keep the desired final shape and dimension while joining, reducing the need for jigs and fixtures.

Figure 12:
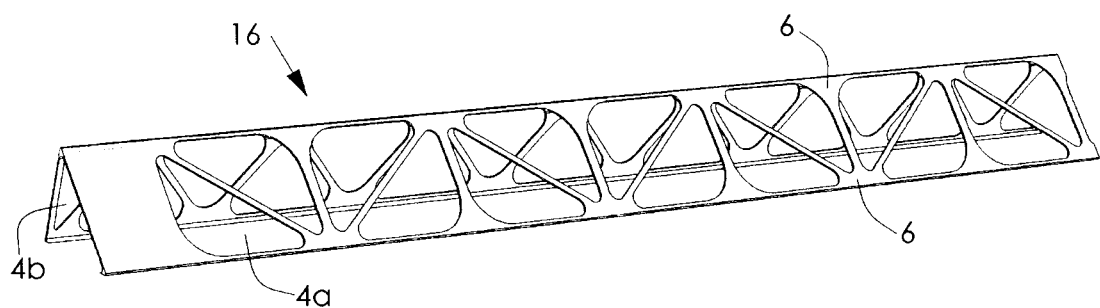
FIG. 12 is a perspective view of an extrusion that may be used together with similar and mirrored extrusions to form the space frame core of the structure in accordance with one embodiment of the present invention.
Figure 13:
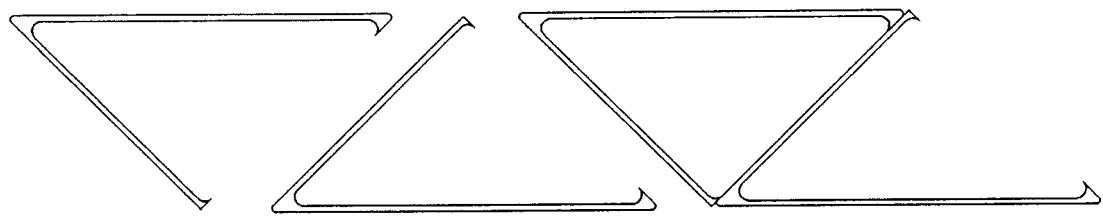
FIG. 13 is a side view of extrusions similar to the one in FIG. 12, and illustrating how they may be assembled together by alternating their orientation to form a space frame core as illustrated in FIG. 6.

Third method according to another embodiment. A metal foam sandwich panel or any other suitable panel is used as the load bearing face panel (3) of the assembly. With this method, the dimensional stability of the metal foam sandwich panel is not required. The truss structure of the planar space frame core (2) is formed with a series of asymmetric V-shaped linear extrusions (16), as illustrated in FIGS. 12 and 13. These extrusions (16) have a majority of the material removed by machining or cutting alternating triangular openings, leaving on each side of the V shape a succession of ribs that are typical of a flat truss. The openings on the larger side (4a) are characterized by being alternating right triangles placed two by two to form a rectangular unit, and wherein two adjacent rectangular units are mirror images of each other; and being on the other side a row of alternating isosceles right triangles (4b) placed two by two to form a rhomboid unit which is reproduced by translation across the extrusion. Two versions of such extrusions (16) are required, having their triangular openings (4a) on their larger side in the mirror image of each other. These extrusions (16) are assembled and joined together by pairing two extrusions in a manner to have their respective larger side lying parallel, such as illustrated in FIG. 13, and by joining such pairs to form the planar space frame core (2) illustrated in FIG. 6. The space frame core is afterward joined at lattice nodes (6) to the face panel (3).

Figure 14:
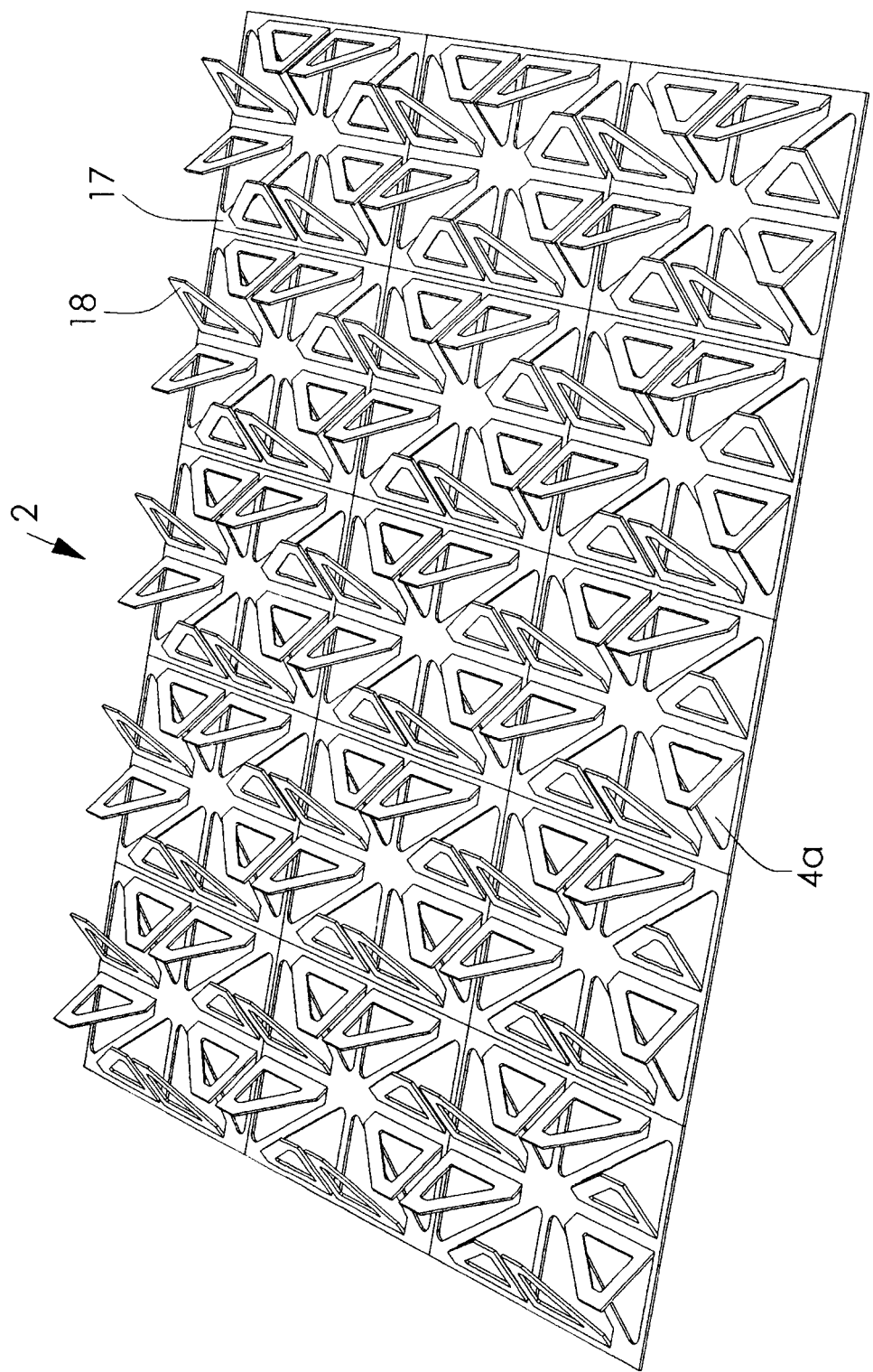
FIG. 14 is a perspective view of a metal sheet having triangular wings cut and bent to form the space frame core of the structure in accordance with another embodiment of the present invention.

Fourth method according to yet another embodiment. A metal foam sandwich panel is used as the load bearing face panel (3) of the assembly. A flat metal sheet (17) as for instance shown in FIG. 14 is used to form the space frame core structure (2). Inside this sheet, triangular wings (18) are cut and bent out at 45 degrees in order to be joined to the face panel (3). The wings (18) are right triangles placed in a manner to create a series of right triangular openings (4a) placed two by two to form rectangular units, and wherein two adjacent rectangular units are mirror images of each other, as illustrated in FIG. 14. The bent line of each triangular wing is lying parallel to the axis of the triangular prismatic-like volumes to be created by the inclined wings (18) between the two surfaces. The bent wings (18) are discontinuous and can be formed using press brake (with discontinuous dies), stamping, and the like.

For very low volume production, it is also possible to simply remove some material at the bent line for an easy manual bending (this approach can lead to additional welding to refill some of those slots after bending). A triangular opening is also made inside each wing (18) in order to eliminate unstressed material and to reproduce the truss-like structure. The resulting embodiment is slightly different than the others aforementioned in that lateral faces of the triangular prismatic volumes (7) are not continuous but built from repetitive discontinuous wings. The resulting space frame topology is not the same than the one described hereinbefore, thus affecting some mechanical properties. However, this method significantly reduces joins and scrap materials and greatly eases the construction of a slightly curved planar space frame structure, such as for a roof construction.

The invention claimed is:

1. A unibody panel structure assembly for a vehicle, comprising a planar space frame core and a load bearing face panel, said planar space frame core being mounted onto a bottom side of said face panel, said planar space frame core being constructed from continuous transverse planar elements arranged into a series of adjacent triangular prisms, extending traverse to the plane of said face panel, said triangular prisms having on each of their three lateral faces a majority of the material removed in a row of alternating triangular openings, said triangular prisms being positioned side by side in a manner to have a first lateral face aligned in a same plane and collectively forming a first planar layer lying parallel to said face panel, said triangular openings located on said first planar layer being alternating right angle triangles placed two by two to form a rectangular unit, wherein two adjacent rectangular units being mirror images of each other, and wherein the edges on each side of the right angles of said right angle triangles are aligned with the edges of said first planar layer, said triangular openings located on the second and third lateral faces of said triangular prisms being alternating isosceles triangles placed two by two to form a rhomboid unit, said rhomboid unit being reproduced by translation across each of said lateral face, and wherein the pattern thereof on the second and third lateral faces are mirror images of each other.

2. A unibody panel structure assembly according to claim 1, wherein said face panel is a metal foam sandwich panel comprising a metallic foam core with metallic skins on each of its sides.

3. A unibody panel structure assembly according to claim 1, wherein said unibody panel structure assembly is closed at its ends by side panels and on the other face opposite the face panel with a bottom panel in order to form an enclosure.

4. A unibody panel structure assembly according to claim 3, wherein the enclosure is a pressurized enclosure housing vehicle components.

5. A unibody panel structure assembly according to claim 3, wherein said unibody panel structure assembly is part of a floor structure of a vehicle.

6. A unibody panel structure assembly according to claim 3, wherein said unibody panel structure assembly is part of a roof structure of a vehicle.

7. A unibody panel structure assembly according to claim 4, wherein said enclosure houses energy storage components and electric/electronic components of an electric vehicle.

8. A unibody panel structure assembly according to claim 6, wherein said unibody panel structure assembly integrates air duct features and heating, ventilation, and air conditioning (HVAC) functionalities.

9. A unibody panel structure assembly according to claim 1, wherein the planar space frame core has a second and similar planar layer on a face thereof opposite to said first planar layer.

10. A method of making a unibody panel structure assembly comprising: removing a majority of the material of at least one metal sheet by cutting at least two rows of alternating isosceles triangular openings in a repetitive rhomboid pattern and in a manner to have a transversal lattice line between each of said row, thereby forming a core unit; bending said core unit at said lattice lines in a zigzag pattern; joining the edges on one side of at least one bent core unit to a face panel, removing a majority of the material of another metal sheet by cutting rows of alternating right triangular openings in a rectangular pattern and in a manner to have a transversal lattice line between each of said row, thereby forming a planar layer; joining said planar layer to said bent cores in order to form a series of triangular prisms.

11. A unibody panel structure assembly for a vehicle comprising a planar space frame core and a load bearing face panel, said planar space frame core being mounted onto a bottom side of said face panel, said planar space frame core being constructed from a metal sheet having a plurality of triangular wings cut and bent out and afterward joined to said face panel, said triangular wings being right angle triangles placed in a manner to create a plurality of right angle triangular openings in said sheet, said openings being placed two by two to form a rectangular unit, and wherein two adjacent rectangular units are mirror images of each other, said rectangular units forming continuous lattice lines on each of their sides, said triangular wings having their respective bent line on one of said lattice line in a manner to be all parallel, said triangular wings being bent in a manner to form a series of triangular prismatic-like volumes between said face panel and said metal sheet and traverse to the plane of said face panel, said triangular wings having a triangular opening in their center.

12. A unibody panel structure assembly according to claim 11, wherein said face panel is a metal foam sandwich panel comprising a metallic foam core with metallic skins on each of its sides.

13. A unibody panel structure assembly according to claim 11, wherein said unibody panel structure assembly is closed at its ends by side panels and on the other face with a bottom panel in order to form an enclosure.

14. A unibody panel structure assembly according to claim 13, wherein said enclosure is a pressurized enclosure housing vehicle components.

15. A unibody panel structure assembly according to claim 13, wherein said unibody panel structure assembly is part of a floor structure of a vehicle.

16. A unibody panel structure assembly according to claim 13, wherein said unibody panel structure assembly is part of a roof structure of a vehicle.

17. A unibody panel structure assembly according to claim 14, wherein said enclosure houses energy storage components and electric/electronic components of an electric vehicle.

18. A unibody panel structure assembly according to claim 16, wherein said unibody panel structure assembly integrates air duct features and heating, ventilation, and air conditioning (HVAC) functionalities.

19. A unibody panel structure assembly according to claim 11, wherein the planar space frame core comprises a second metal sheet forming a planar layer lying on top of said triangular wings and having a plurality of alternating right-angled triangular openings in a rectangular pattern.

20. A vehicle having a construction comprising a least one unibody panel structure assembly according to claim 11.

* * * * *